(12) United States Patent
Wu et al.

(10) Patent No.: US 7,860,066 B2
(45) Date of Patent: *Dec. 28, 2010

(54) ADAPTIVE SCHEDULING FOR MULTI-CARRIER SYSTEMS

(75) Inventors: Jianming Wu, Nepean (CA); Wen Tong, Ottawa (CA)

(73) Assignee: Ericsson AB, Stockholm (SE)

( * ) Notice: Subject to any disclaimer, the term of this patent is extended or adjusted under 35 U.S.C. 154(b) by 524 days.

This patent is subject to a terminal disclaimer.

(21) Appl. No.: 11/841,413

(22) Filed: Aug. 20, 2007

(65) Prior Publication Data

US 2007/0286131 A1    Dec. 13, 2007

Related U.S. Application Data

(63) Continuation of application No. 10/172,626, filed on Jun. 14, 2002, now Pat. No. 7,260,077.

(60) Provisional application No. 60/299,062, filed on Jun. 18, 2001.

(51) Int. Cl.
H04B 7/212    (2006.01)
H04L 12/66    (2006.01)

(52) U.S. Cl. .................. 370/337; 370/347; 370/349; 370/352

(58) Field of Classification Search .................. None
See application file for complete search history.

(56) References Cited

U.S. PATENT DOCUMENTS

| | | | |
|---|---|---|---|
| 4,313,035 A | 1/1982 | Jordan et al. | |
| 5,206,901 A | 4/1993 | Harlow et al. | |
| 5,243,645 A | 9/1993 | Bissell et al. | |
| 5,329,578 A | 7/1994 | Brennan et al. | |
| 5,550,907 A | 8/1996 | Carlsen | |

(Continued)

FOREIGN PATENT DOCUMENTS

| | | |
|---|---|---|
| EP | 0484067 A2 | 5/1992 |
| EP | 1043902 A2 | 10/2000 |
| WO | 98/35514 A2 | 8/1998 |
| WO | 00/41542 A2 | 7/2000 |

OTHER PUBLICATIONS

International Search Report for PCT/IB2004/000619, mailed Sep. 1, 2004.
International Search Report for PCT/IB2004/000596, mailed Jul. 9, 2004.

*Primary Examiner*—Chi H Pham
*Assistant Examiner*—Soon-Dong D Hyun
(74) *Attorney, Agent, or Firm*—Withrow & Terranova, P.L.L.C.

(57) ABSTRACT

A scheduler in a base station determines or estimates a cumulative throughput based on the scheduling criteria used by the base station. Based on the cumulative throughput for each slot, the mobile terminals are divided into one of two groups. The first group is provided for mobile terminals having a lower throughput, while the remaining mobile terminals are placed in a second group associated with higher throughput. The mobile terminal in the first group having the lowest throughput has data scheduled for transmission on the next slot over the best available carrier. The remaining mobile terminals in the first group are iteratively scheduled for transmission on the best remaining carriers, until no mobile terminals remain. Once scheduling for the first group is complete, scheduling for the second group can take place. Preferably, scheduling for the second group is performed to maximize throughput on the remaining carrier or carriers.

23 Claims, 3 Drawing Sheets

U.S. PATENT DOCUMENTS

Figure 1:
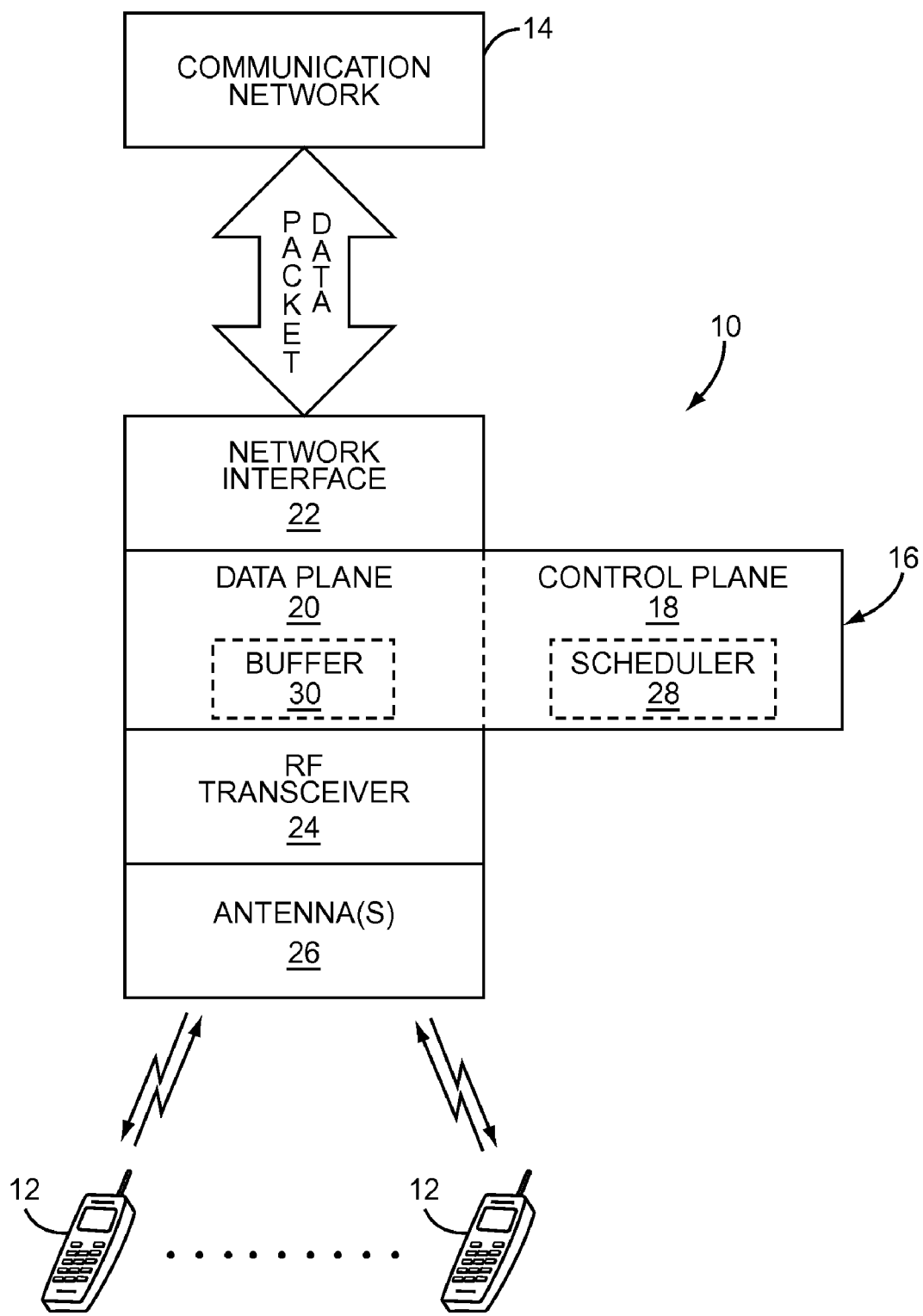

| | | |
|---|---|---|
| 5,724,411 A | 3/1998 | Eisdorfer et al. |
| 5,793,859 A | 8/1998 | Matthews |
| 5,802,160 A | 9/1998 | Kugell et al. |
| 5,805,587 A | 9/1998 | Norris et al. |
| 5,896,448 A | 4/1999 | Holt |
| 5,898,928 A | 4/1999 | Karlsson et al. |
| 5,905,789 A | 5/1999 | Will |
| 5,946,386 A | 8/1999 | Rogers et al. |
| 5,978,673 A | 11/1999 | Alperovich et al. |
| 6,011,843 A | 1/2000 | Hochman et al. |
| 6,052,596 A | 4/2000 | Barnickel |
| 6,094,478 A | 7/2000 | Shepherd et al. |
| 6,104,799 A | 8/2000 | Jain et al. |
| 6,108,321 A | 8/2000 | Anderson et al. |
| 6,125,176 A | 9/2000 | Foladare et al. |
| 6,130,938 A | 10/2000 | Erb |
| 6,141,556 A | 10/2000 | Dougherty et al. |
| 6,144,644 A | 11/2000 | Bajzath et al. |
| 6,208,854 B1 | 3/2001 | Roberts et al. |
| 6,301,350 B1 | 10/2001 | Henningson et al. |
| 6,330,322 B1 | 12/2001 | Foladare et al. |
| 6,366,661 B1 | 4/2002 | Devillier et al. |
| 6,377,668 B1 | 4/2002 | Smock et al. |
| 6,389,039 B1 | 5/2002 | Katinakis et al. |
| 6,678,366 B1 | 1/2004 | Burger et al. |
| 6,801,513 B1 | 10/2004 | Gibbons et al. |
| 6,879,561 B1 | 4/2005 | Zhang et al. |
| 7,042,856 B2 | 5/2006 | Walton et al. |

ADAPTIVE SCHEDULING FOR MULTI-CARRIER SYSTEMS

This application is a continuation of application Ser. No. 10/172,626, filed Jun. 14, 2002, now U.S. Pat. No. 7,260,077, which claims the benefit of provisional application Ser. No. 60/299,062, filed Jun. 18, 2001, the disclosures of which are hereby incorporated by reference in their entireties.

FIELD OF THE INVENTION

The present invention relates to wireless communications, and in particular to scheduling data for transmission from a base station to one or more mobile terminals.

BACKGROUND OF THE INVENTION

Wireless communication networks that allocate communication resources, such as time or frequency, require a scheduler to select data to be transmitted. When multiple users are vying for these resources, the scheduler must analyze the incoming data and determine the data having the highest priority for transmission. Priority has traditionally been based on maximizing overall system throughput or maintaining a certain Quality of Service (QoS) level to ensure that data is transmitted in a timely fashion. When maximizing throughput, users having better channel conditions are favored over those with worse channel conditions. Thus, the users with the less favorable channel conditions are always given lower priority. As a result, those users with poor channel conditions are prone to lower QoS levels. In contrast, trying to maintain certain QoS levels often leads to unnecessarily low system throughput.

Many schedulers prioritize packets based solely on carrier-to-interference ratios (CIRs) derived from information fed back from the mobile terminals. Such schedulers maximize throughput without regard to fairness or minimum throughput requirements and typically schedule delivery for users that are closest to the base station. Schedulers attempting to provide some degree of fairness use rudimentary scheduling criteria, resulting in poor system throughput. There are also many problems with existing schedulers in terms of supporting multi-media wireless-internet services. Further, most schedulers are not designed for multi-carrier operation, which makes them unsuitable for multiple carrier—data and voice (MC-DV) environments.

These existing scheduling techniques fail to provide an adaptive scheduling criterion that is capable of evolving to meet the constantly varying demands of the wireless communication environment to optimize throughput while ensuring a defined degree of fairness among users. Accordingly, there is a need for an adaptive scheduling technique to optimize throughput while ensuring fairness among users. There is a further need for a scheduling technique with these capabilities that can optimize multi-carrier diversity in order to maximize overall system throughput while maintaining a desired degree of fairness.

SUMMARY OF THE INVENTION

The present invention provides for scheduling in a multi-carrier, wireless environment. For each frame, scheduling for the mobile terminals supported by a base station is carried out on a slot-by-slot basis. A scheduler in the base station determines or estimates a cumulative throughput based on the scheduling criteria used by the base station. Based on the cumulative throughput for each slot, the mobile terminals are divided into one of two groups. The first group is provided for mobile terminals having a lower throughput, while the remaining mobile terminals are placed in a second group associated with higher throughput. Preferably, the number of mobile terminals in the first group is less than the total number of carriers in the system. As such, the mobile terminal in the first group having the lowest throughput has data scheduled for transmission on the next slot over the best available carrier. The remaining mobile terminals in the first group are iteratively scheduled for transmission on the best remaining carriers, until no mobile terminals remain. Once scheduling for the first group is complete, scheduling for the second group can take place. Preferably, scheduling for the second group is performed to maximize throughput on the remaining carrier or carriers.

Maximizing throughput in the second group preferably involves finding the best possible carrier and mobile terminal combination, wherein channel conditions will support the highest coding and modulation rates to maximize throughput. In alternate embodiments, the present invention may incorporate maximum carrier-to-interference ratio scheduling or proportional fairness scheduling to maximize throughput for the second group.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 is a block representation of a wireless communication environment according to one embodiment of the present invention.

Figure 2A:
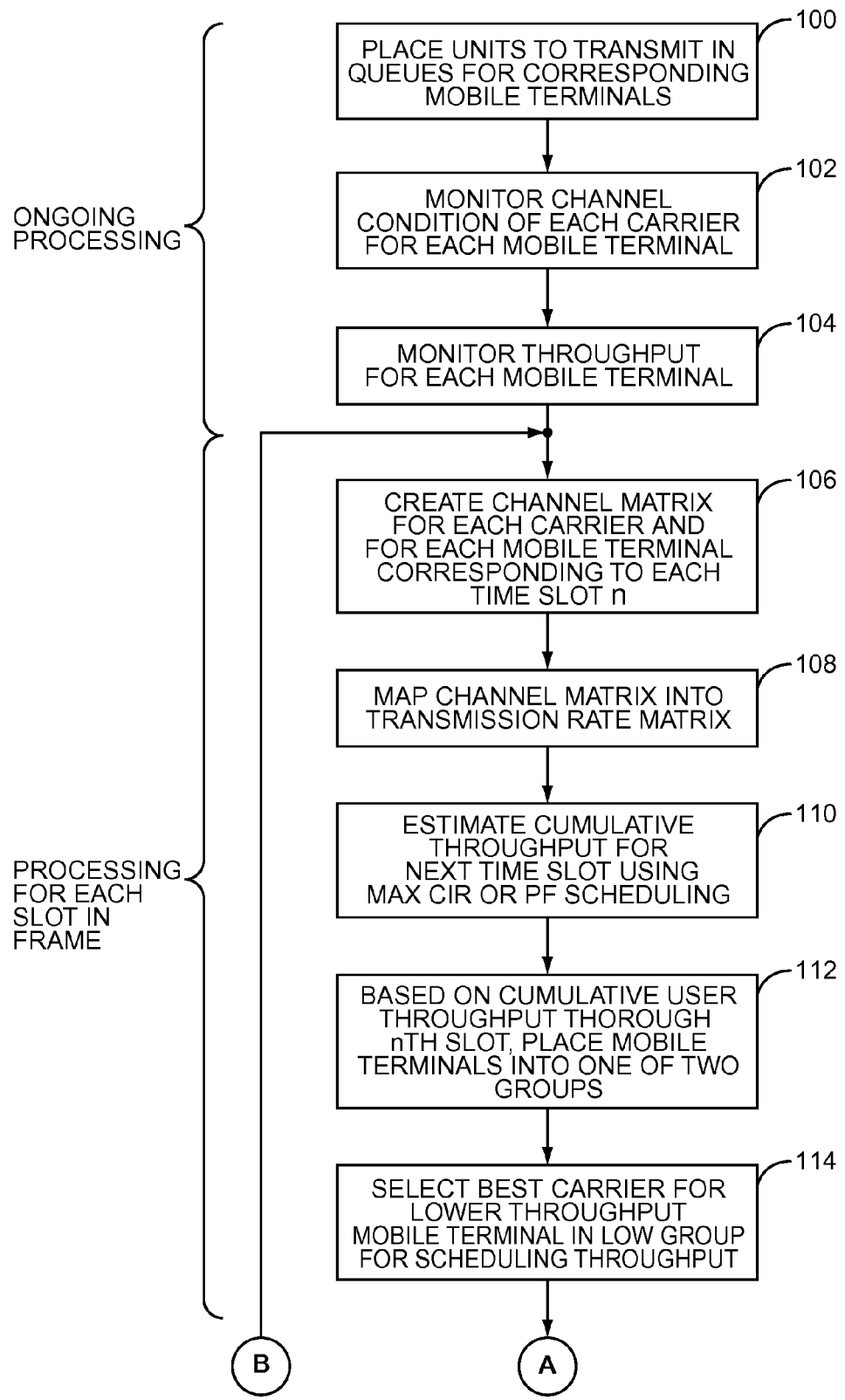
Figure 2B:
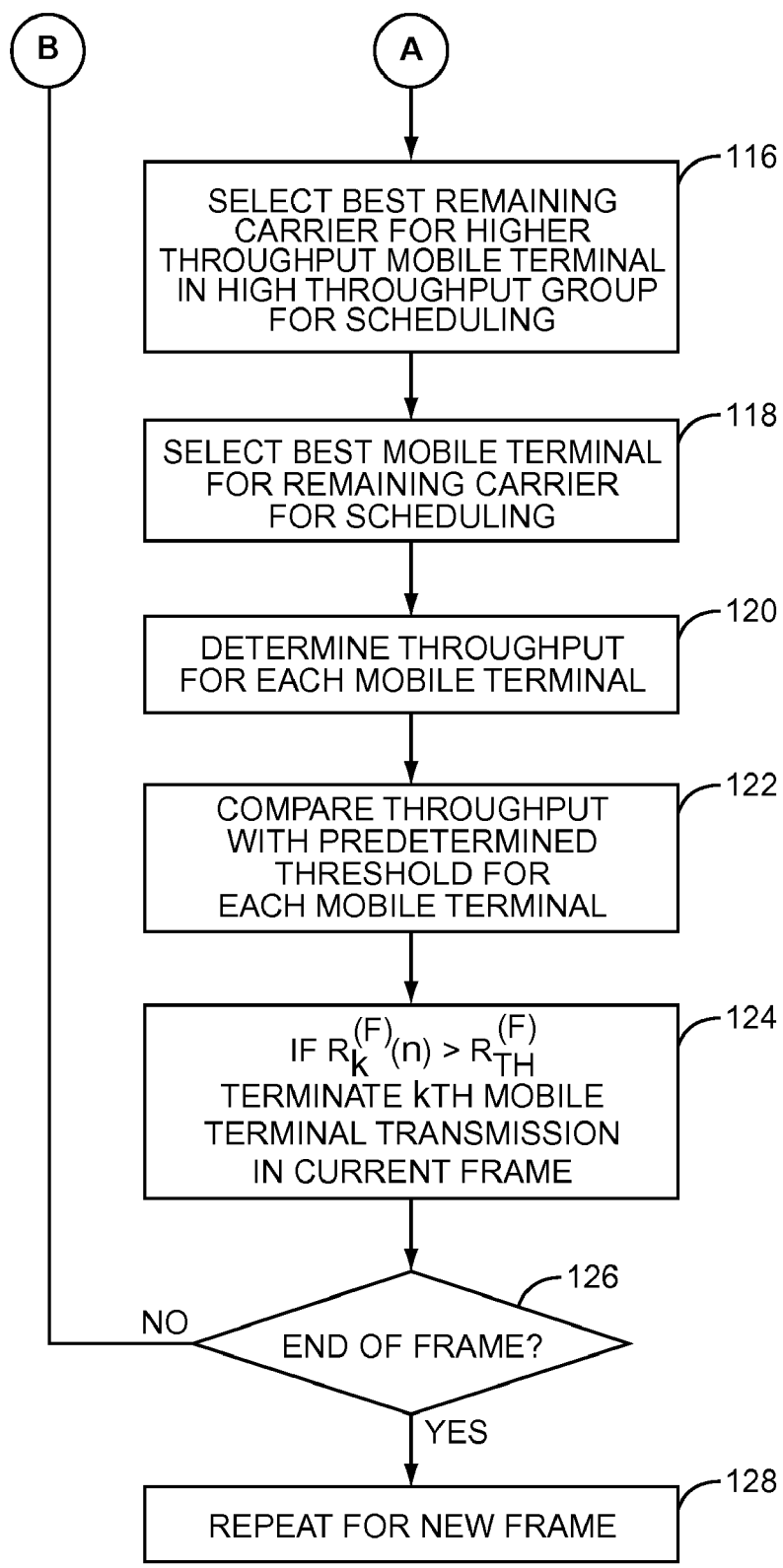

FIGS. 2A and 2B provide a flow diagram according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In general, data is scheduled for transmission from a base station to any number of mobile terminals supported by the base station. Typically, data arriving at the base station for delivery to a mobile terminal must be delivered to the mobile terminal within a defined period of time, referred to a frame. Normally, the data must be transmitted within the time period defined by the frame; however, the time at which the data is transmitted or received is immaterial as long as the data is received before the frame ends.

Each frame is broken into multiple time slots in which all or a portion of the data is scheduled for transmission. The scheduling function of the base station will schedule the data for transmission over a carrier to one of the mobile terminals during one or more slots using defined scheduling criteria. In a multi-carrier system, the scheduler schedules data for transmission over each carrier during a given time slot to different mobile terminals. Thus, data for different mobile terminals is transmitted simultaneously during a given time slot within the frame. The scheduling criteria facilitate scheduling such that the data for all mobile terminals is scheduled for transmission prior to the corresponding frame ending.

The present invention provides scheduling criteria, which operate to optimize transmission throughput to all mobile terminals on a frame-by-frame basis in light of a defined outage probability. The outage probability bears on the rate at which data is lost during transmission. In general, the scheduling criteria define a target transmission data rate and monitor the throughput for each mobile terminal on a slot-by-slot basis throughout the frame. Once the target transmission rate for the frame has been reached for any given mobile terminal, no further scheduling is provided for that mobile terminal. The scheduling criteria will also prioritize mobile terminals suffering from a lower throughput over those associated with a higher throughput to ensure fairness among all mobile terminals. Further scheduling details are provided below following a breakdown of the basic architecture of a base station.

With reference to FIG. 1, wireless networks use access points, such as base stations 10, to facilitate communications with access terminals, such as mobile terminals 12, within a select coverage area, or cell. Respective groups of base stations 10 are supported by a communication network 14, which may include mobile switching centers, a public switched telephone network (PSTN), a packet-switched network, or a combination thereof. The communication network 14 is used to transport packets to and from the base station 10. The packets may be communicated in a direct packet-switched manner or on top of a circuit-switched platform. The manner in which the packets are communicated to the base station 10 is not critical to the invention.

During forward link communications from the base station 10 to select mobile terminals 12, the base station 10 must determine the manner and order in which to transmit the data received in the packets from the communication network 14 to the mobile terminals 12. In multiple carrier systems, the base station 10 will also determine the carrier, or channel, on which to deliver the packets. Accordingly, the base station 10 will include a control system 16 having a control plane 18 controlling the flow of data through a data plane 20. For communicating with the mobile terminals 12, the data plane 20 will process packets received from the communication network 14 via a network interface 22 under the control of the control plane 18. The packets are processed into units, which are delivered to radio frequency (RF) transceiver circuitry 24 for transmission. For the sake of clarity, the term "packet" refers to packetized data, which is received by the base station 10 from the communication network 14. The term "unit" refers to packetized data that is transmitted from the base station 10 to the mobile terminals 12. A unit may include all or any part of one or more packets. Although units may directly correspond to packets, units are preferably a given size wherein packets may vary in size from one packet to another. The units may include voice, video, or traditional data.

The forward link from the base station 10 to the mobile terminal 12 will include one or more channels, which are divided into defined time slots. The RF transceiver circuitry 24 is configured to modulate a given unit as dictated by the control plane 18 and transmit the modulated unit via one or more antennas 26 during a single time slot. The RF transceiver circuitry 24 is preferably configured to implement different modulation and coding techniques based on channel conditions, the capabilities of the mobile terminals 12, or required transmission standards. As noted, the RF transceiver circuitry 24 may transmit units over a number of distinct carriers. Those skilled in the art will recognize the various possible modulation techniques and that multiple units may be transmitted in a given time slot.

The control plane 18 includes a scheduler 28, which is configured to prioritize and control the delivery order of units to the mobile terminals 12 based on parameters detailed further below. During operation, packets for any number of mobile terminals 12 are received and stored in a buffer 30 associated with the data plane 20. The buffer 30 is segregated into multiple queues, each associated with a given mobile terminal 12. If the packets do not directly correspond to units, the incoming packets are processed into the desired units. The units are stored in the respective queues in the order in which they are received. Preferably, the queues use a first-in-first-out (FIFO) configuration.

The present invention provides different scheduling criteria depending on overall system performance in an effort to maintain fairness among mobile terminals 12 and sustain a required QoS level. The invention is particularly effective for multi-carrier systems, wherein scheduling must also take into consideration the carrier used to transmit the scheduled data.

With reference to the flow diagram of FIGS. 2A and 2B, operation of the scheduler 28 is illustrated according to one embodiment. On an ongoing basis, the units to transmit are placed in queues for the corresponding mobile terminals 12 (step 100). Further, the scheduler 28 will continuously monitor channel conditions for each carrier and each mobile terminal 12 as reported back from the mobile terminals 12 (step 102). In general, a channel condition represents the quality of the transmission channel from the base station 10 to the mobile terminals 12 for each of the multiple carriers.

Channel conditions may vary continuously and may be determined using any number of techniques. For example, carrier-to-interference ratios (CIRs), which represent a measure of carrier signal power to interference power, may be fed back to the base station 10 from the mobile terminals 12. Pilot signal strengths, error rates, and the like may also be used to derive channel conditions. As noted above, the scheduler 28 will preferably continuously track channel conditions for each carrier and mobile terminal 12 (step 102). The scheduler 28 will also monitor the throughput for each mobile terminal 12 (step 104). The throughput rates may be a function of actual or estimated data throughput rates, channel conditions, or a combination thereof.

The present invention strives to maintain an average transmission data rate for each mobile terminal 12 on a frame-by-frame basis. In essence, the scheduling ensures a set transmission data rate is achieved for each mobile terminal 12 over each frame. Further, scheduling for mobile terminals 12 with a lower throughput is prioritized as necessary to meet the average transmission rate. In the described embodiment, the following processing occurs on a slot-by-slot basis throughout each frame.

Initially, a channel matrix indicative of channel quality is created for each carrier and each mobile terminal 12 (step 106). The channel matrix may be created using available or estimated carrier-to-interference ratios, pilot signal strengths, error rates or the like, which are monitored and reported back to the base station 10 by the mobile terminals 12. Assuming the channel matrix is based on CIRs, each mobile terminal 12 monitors the channel conditions of N separate carriers using N common pilot signals and determines N separated CIRs. The CIRs are then sent to the base station 10. The base station 10 will create a CIR matrix, $\underline{\Gamma}(n)$ (step 106), which can be expressed as $$\underline{\Gamma}(n) = \begin{bmatrix} \Gamma_{0,0}(n) & \Gamma_{0,1}(n) & \cdots & \Gamma_{0,M-1}(n) \\ \Gamma_{1,0}(n) & \Gamma_{1,1}(n) & \cdots & \Gamma_{1,M-1}(n) \\ \vdots & \vdots & \ddots & \vdots \\ \Gamma_{N-1,0}(n) & \Gamma_{N-1,1}(n) & \cdots & \Gamma_{N-1,M-1}(n) \end{bmatrix} \quad \text{Eq. 1}$$

where M is the number of mobile terminals 12. Based on the adaptive modulation and coding (AMC) associated with the respective channel conditions, the CIR matrix can be mapped into a transmission rate matrix, $\underline{R}$, which is indicative of the potential throughput for each mobile terminal 12 and each carrier for the next slot n (step 108). The transmission rate matrix, $\underline{R}$ can be expressed as $$\underline{R}(n) = \begin{bmatrix} R_{0,0}(n) & R_{0,1}(n) & \cdots & R_{0,M-1}(n) \\ R_{1,0}(n) & R_{1,1}(n) & \cdots & R_{1,M-1}(n) \\ \vdots & \vdots & \ddots & \vdots \\ R_{N-1,0}(n) & R_{N-1,1}(n) & \cdots & R_{N-1,M-1}(n) \end{bmatrix} \quad \text{Eq. 2}$$

By using the resulting transmission rate matrix, $\underline{R}(n)$, as well as the scheduling criteria, such as maximum CIR or proportional fairness (PF), the scheduler 28 can estimate the cumulated user throughput in the next time slot n (step 110), as given by $$\hat{\Delta}(n) = [\hat{\Lambda}_0(n), \hat{\Lambda}_1(n), \cdots, \hat{\Lambda}_{M-1}(n)] \quad \text{Eq. 3}$$

where $$\hat{\Lambda}_m(n) = \Lambda_m(n-1) + \sum_{k=0}^{N-1} \alpha_{k,m}(n) \cdot R_{k,m}(n), \quad \text{Eq. 4}$$

and where $\alpha_{k,m}(n)=1$ for an active kth carrier for the mth user and $\alpha_{k,m}(n)=0$ for an inactive kth carrier for the mth user. In another arrangement, $\alpha_{k,m}(n)=p$ for an active kth carrier for the mth user and $\alpha_{k,m}(n)=1-p$ for an inactive kth carrier for the mth user Based on the estimated cumulated user throughput after a few slots, adaptive scheduling criteria can be applied according to the present invention. The scheduling criterion employs both multi-carrier frequency diversity as well as multi-user diversity, such as maximum CIR or proportional fairness. As noted, the present example is based on three carriers, but those skilled in the art will recognize the applicability and flexibility of the invention system having more than three carriers.

Accordingly, based on the cumulative user throughput after n slots during the current frame interval, each mobile terminal 12 is placed in one of two groups (step 112). The two mobile terminals 12 associated with the lowest throughput are placed in the first group while the remaining mobile terminals are placed in the second group. The scheduler 28 will then select the best carrier from the three carriers to schedule data for mobile terminal 12 in the first group having the lowest throughput (step 114). The scheduler 28 will next select the best carrier from the remaining two carriers to schedule data for the remaining mobile terminal 12 in the first group (step 116). If more than three carriers are available, the first group would preferably have more mobile terminals 12, wherein scheduling is prioritized in favor of the mobile terminal 12 having the lowest throughput. Once the first group is scheduled, the scheduler 28 will attempt to maximize throughput over the remaining carrier by selecting the best mobile terminal 12 capable of having the highest throughput for the remaining carrier for scheduling (step 118).

Next, the scheduler 28 will compare the throughput during the frame for each mobile terminal 12 with each mobile terminal's throughput threshold (step 120). In one embodiment of the present invention, the QoS of real-time transmissions are evaluated by employing a threshold relative to a predetermined target transmission rate $R_{TH}^{(F)}$. The predetermined target transmission rate $R_{TH}^{(F)}$ is used to help calculate an acceptable outage probability, $\overline{P}_{OUT}$. The outage probability $\overline{P}_{OUT}$ is calculated as follows:

$$\overline{P}_{OUT} = \frac{1}{M} \sum_{k=0}^{M-1} Pr[R_k^{(F)}(L-1) < R_{TH}^{(F)}], \quad \text{Eq. 5}$$

where M is the number of mobile terminals 12 and $R_k^{(F)}(n)$ represents the average transmission data rate for the kth mobile terminal 12 after n transmission slots. The average data transmission rate for the kth mobile terminal 12 can be represented as:

$$R_k^{(F)}(n) = \frac{\Lambda_k(n)}{T_F}, \quad \text{Eq. 6}$$

for n=0, 1, ..., L−1, where $\Lambda_k(n)$ is the accumulated throughput for the kth mobile terminal 12 after n transmission slots during the current frame. Using Equation 5, the given target transmission data rate $R_{TH}^{(F)}$ corresponds to a certain outage probability of this rate. As such, the present invention can easily control the real-time service throughput on a frame-by-frame basis based on the predetermined, target transmission data rate $R_{TH}^{(F)}$, resulting in a significantly flexible and controllable real-time service system.

In particular, the scheduler 28 will use the comparisons in step 122 to terminate transmissions for the kth mobile terminal 12 in the current frame if the throughput rates $R_k^{(F)}(n)$ is greater than or equal to the target transmission data rate $R_{TH}^{(F)}$ (step 124). In this manner, when only a certain data rate per frame is required, resources aren't wasted by sending extra data during a given frame when priority can be applied to mobile terminals 12 that have yet to reach the threshold. The actual throughput can be determined by estimating the adaptive modulation and coding for transmission for the kth mobile terminal 12, implementing automated retransmission requests (ARQ), hybrid ARQ protocol, or the like, to determine actual throughput. Those skilled in the art will recognize numerous techniques for determining the throughput for each of the k mobile terminals 12. The scheduler 28 will then check to see if it has reached the end of the frame (step 126). If the frame has not ended, the process repeats back to step 106, and if the frame has come to an end, the entire process is repeated for a new frame (step 128).

With the present invention, the mobile terminals 12 associated with the lowest throughput are given access to the carriers providing them with the best channel conditions, while one or more carriers are reserved to maximize throughput for the remaining mobile terminal or terminals 12 capable of maximizing overall throughput. Thus, the mobile terminals 12 with the most favorable channel conditions are capable of transmitting a lot of data in a short period of time, as they will most likely have higher coding and modulation rates and transmit a sufficient amount of data to meet the throughput threshold within a given frame in short order. The prioritization of the lowest throughput mobile terminals 12 ensures a minimum QoS level for those mobile terminals 12 associated with the poorest channel conditions. Terminating scheduling for mobile terminals 12 that reach the throughput threshold within a given frame eliminates wasted resources by transmitting more data in a frame than is necessary.

Those skilled in the art will recognize various scheduling criteria to maximize throughput in addition to maximum CIR and proportional fairness scheduling. Further, different mobile terminals 12 may have different threshold throughput rates to allow varying QoS levels for the different mobile terminals 12. The number of mobile terminals 12 placed in the first and second groups may vary depending on application and the number of carriers. For example, for a ten-carrier system, the first group may have any number of mobile terminals 12 assigned to it, from two to nine.

These aspects of the invention can be implemented using alternative equations and relationships than those described in detail above. Those skilled in the art will recognize improvements and modifications to the preferred embodiments of the present invention. All such improvements and modifications are considered within the scope of the concepts disclosed herein and the claims that follow.

What is claimed is:

1. A method for scheduling data for transmission to mobile terminals in a multi-carrier, wireless communication environment comprising:
   a) determining a cumulated throughput up to or through a given slot of a given frame for each of the mobile terminals;
   b) placing mobile terminals having a lower cumulated throughput in a first group;
   c) placing mobile terminals having a higher cumulated throughput in a second group;
   d) for the first group, iteratively scheduling data for a slot for transmission to the mobile terminals with a lowest cumulated throughput on a best available carrier until the data for each mobile terminal in the first group is scheduled, wherein once data is scheduled for the slot on the carrier the carrier becomes unavailable; and
   e) for the second group, scheduling data for the slot for transmission to at least one mobile terminal on an available carrier to maximize throughput.

2. The method of claim 1 wherein steps a through e are iteratively provided on a slot-by-slot basis for each frame.

3. The method of claim 1 wherein steps a through e are iteratively provided after x slots into each frame.

4. The method of claim 1 wherein scheduling for the second group to maximize throughput uses a proportional fairness scheduling criteria.

5. The method of claim 1 wherein scheduling for the second group to maximize throughput uses a maximum carrier-to-interference ratio scheduling criteria.

6. The method of claim 1 wherein the cumulated throughput for each mobile terminal is an estimate of actual throughput for each mobile terminal.

7. The method of claim 6 wherein the cumulated throughput is estimated by:
   a) creating a channel matrix for each mobile terminal and each carrier;
   b) mapping the channel matrix into a transmission rate matrix for each mobile terminal and each carrier based on available coding and modulation schemes; and c) estimating the cumulated throughput based at least in part on scheduling criteria used during scheduling in the first and second groups.

8. The method of claim 1 wherein:
   a) there are three carriers;
   b) the first group includes a first mobile terminal having a lowest cumulated throughput and a second mobile terminal having a next-to-lowest cumulated throughput;
   c) for the first group, the method comprises:
      i) scheduling data for transmission to the first mobile terminal during the slot on a best available carrier for transmitting data to the first mobile terminal; and
      ii) scheduling data for transmission to the second mobile terminal during the slot on a best available carrier selected from the remaining carriers for transmission to the second mobile terminal; and
   d) for the second group, the method comprises:
      i) selecting a mobile terminal from the second group capable of maximizing throughput over a remaining one of the three carriers; and
      ii) scheduling data for the slot for transmission to a selected mobile terminal on an available carrier to maximize throughput.

9. A system for scheduling data for transmission to mobile terminals in a wireless communication environment comprising a base station having a control plane and a scheduler, the control plane and scheduler adapted to:
   a) determine a cumulated throughput up to or through a given slot of a given frame for each of the mobile terminals;
   b) place mobile terminals having a lower cumulated throughput in a first group;
   c) place mobile terminals having a higher cumulated throughput in a second group;
   d) for the first group, iteratively schedule data for a slot for transmission to the mobile terminals with a lowest cumulated throughput on a best available carrier until the data for each mobile terminal in the first group is scheduled, wherein once data is scheduled for the slot on the carrier the carrier becomes unavailable; and
   e) for the second group, schedule data for the slot for transmission to at least one mobile terminal on an available carrier to maximize throughput.

10. The system of claim 9 wherein the control plane and scheduler are further adapted to iteratively provide steps a through e on a slot-by-slot basis for each frame.

11. The system of claim 9 wherein the control plane and scheduler are further adapted to iteratively provide steps a through e after x slots into each frame.

12. The system of claim 9 wherein scheduling for the second group to maximize throughput uses a proportional fairness scheduling criteria.

13. The system of claim 9 wherein scheduling for the second group to maximize throughput uses a maximum carrier-to-interference ratio scheduling criteria.

14. The system of claim 9 wherein the cumulated throughput for each mobile terminal is an estimate of actual throughput for each mobile terminal.

15. The system of claim 14 wherein the control plane and scheduler are adapted to estimate the cumulated throughput by:
   a) creating a channel matrix for each mobile terminal and each carrier;
   b) mapping the channel matrix into a transmission rate matrix for each mobile terminal and each carrier based on available coding and modulation schemes; and c) estimating the cumulated throughput based at least in part on scheduling criteria used during scheduling in the first and second groups.

16. The system of claim 9 wherein:
a) there are three carriers;
b) the first group includes a first mobile terminal having a lowest cumulated throughput and a second mobile terminal having a next-to-lowest cumulated throughput;
c) for the first group, the control plane and scheduler are adapted to:
  i) schedule data for transmission to the first mobile terminal during the slot on the best available carrier for transmitting data to the first mobile terminal; and
  ii) schedule data for transmission to the second mobile terminal during the slot on a best available carrier selected from the remaining carriers for transmission to the second mobile terminal; and
d) for the second group, the control plane and scheduler are adapted to:
  i) select a mobile terminal from the second group capable of maximizing throughput over a remaining one of the three carriers; and
  ii) schedule data for the slot for transmission to a selected mobile terminal on an available carrier to maximize throughput.

17. A method for scheduling data for transmission to mobile terminals in a three carrier, wireless communication environment comprising:
a) determining a cumulated throughput up to or through a given slot of a given frame for each of the mobile terminals;
b) placing a first mobile terminal having a lowest cumulated throughput and a second mobile terminal having a next-to-lowest cumulated throughput in a first group;
c) placing all other mobile terminals in a second group;
d) for the first group:
  i) scheduling data for transmission to the first mobile terminal during the slot on a best available carrier for transmitting data to the first mobile terminal; and
  ii) scheduling data for transmission to the second mobile terminal during the slot on a best available carrier selected from the remaining carriers for transmission to the second mobile terminal, wherein once data is scheduled for the slot on the carrier the carrier becomes unavailable; and
e) for the second group, scheduling data for the slot for transmission to at least one mobile terminal on an available carrier to maximize throughput.

18. The method of claim 17 wherein steps a through e are iteratively provided on a slot-by-slot basis for each frame.

19. The method of claim 17 wherein steps a through e are iteratively provided after x slots into each frame.

20. The method of claim 17 wherein scheduling for the second group to maximize throughput uses a proportional fairness scheduling criteria.

21. The method of claim 17 wherein scheduling for the second group to maximize throughput uses a maximum carrier-to-interference ratio scheduling criteria.

22. The method of claim 17 wherein the cumulated throughput for each mobile terminal is an estimate of actual throughput for each mobile terminal.

23. The method of claim 22 wherein the cumulated throughput is estimated by:
a) creating a channel matrix for each mobile terminal and each carrier;
b) mapping the channel matrix into a transmission rate matrix for each mobile terminal and each carrier based on available coding and modulation schemes; and
c) estimating the cumulated throughput based at least in part on scheduling criteria used during scheduling in the first and second groups.

* * * * *

UNITED STATES PATENT AND TRADEMARK OFFICE
CERTIFICATE OF CORRECTION

PATENT NO. : 7,860,066 B2
APPLICATION NO. : 11/841413
DATED : December 28, 2010
INVENTOR(S) : Wu et al.

Page 1 of 1

It is certified that error appears in the above-identified patent and that said Letters Patent is hereby corrected as shown below:

In Column 2, Lines 25-26, in Heading, delete "DRAWING FIGURES" and insert -- DRAWINGS --, therefor.

In Column 2, Line 28, delete "drawing figures" and insert -- drawings --, therefor.

In Column 2, Line 45, delete "drawing figures," and insert -- drawings, --, therefor.

In Column 5, Lines 3-6, in Equation "1", delete "$\begin{bmatrix} \Gamma_{0,M-1}(n) \\ \Gamma_{1,M-1}(n) \\ \vdots \\ \Gamma_{N-1,M-1}(n) \end{bmatrix}$" and insert -- $\begin{bmatrix} \Gamma_{0,M-1}(n) \\ \Gamma_{1,M-1}(n) \\ \vdots \\ \Gamma_{N-1,M-1}(n) \end{bmatrix}$ --, therefor.

In Column 5, Line 44, after "mth user" insert -- . --.

Signed and Sealed this
Twenty-third Day of August, 2011

David J. Kappos
*Director of the United States Patent and Trademark Office*